United States Patent
Till et al.

[15] 3,667,245
[45] June 6, 1972

[54] FAN AND CLUTCH CONTROL CIRCUIT FOR AN AIR CONDITIONER

[72] Inventors: James Peter Till, 341 Blacklatch Lane, Camp Hill, Pa. 17011; William Jeffrey Hudson, Jr., R.D. #1, P.O. Box 115, Hummelstown, Pa. 17036

[22] Filed: June 8, 1970

[21] Appl. No.: 44,493

[52] U.S. Cl. ................................................. 62/180, 62/229
[51] Int. Cl. ............................................................ F25d 17/00
[58] Field of Search ............................... 62/180, 181, 229

[56] References Cited
UNITED STATES PATENTS

| 3,455,118 | 7/1969 | Petranek | 62/229 |
| 3,545,219 | 12/1970 | Falk | 62/180 |

*Primary Examiner*—Meyer Perlin
*Attorney*—William J. Keating, Ronald D. Grefe, Gerald K. Kita, Frederick W. Raring, Jay L. Seitchik and John P. Vandenburg

[57] ABSTRACT

A fan and clutch control circuit controls the operation and speed of a fan of an air conditioner over a preselected temperature range and controls the operation of a magnetically operated clutch to drive a compressor of the air conditioner at selected temperatures.

9 Claims, 4 Drawing Figures

FAN AND CLUTCH CONTROL CIRCUIT FOR AN AIR CONDITIONER

This invention relates to an electrical control circuit and more particularly to a fan and clutch control circuit controlling the operating and speed of a fan and the operation of a magnetically operated clutch of an air conditioner.

In existing air conditioners, fan control is via an electro-mechanical switch which allows only manual selection of high, medium or low fan speeds. These speeds are fixed and no temperature dependent means to effect automatic speed regulation of the fan over a preselected temperature range is provided. The electro-mechanical control system also does not provide an independent selection of comfort level, for example a temperature range of 65°–75° F. Moreover, no provision is made in existing air conditioner control systems to automatically control the temperature during certain weather conditions such as the comparatively cooler mornings or evenings of hot days. Therefore the fan air that has been driven across the evaporator coils will be uncomfortably cool unless the fan speed or temperature setting is manually changed.

An object of the invention is to provide a fan and clutch control circuit for controlling the operation and speed of a fan of an air conditioner over a preselected temperature range and for also controlling the operation of a magnetically operated clutch to drive a compressor of the air conditioner at selected temperatures.

Another object is the provision of an air conditioner control circuit wherein the fan speed is automatically varied in a linear manner over a preselected temperature range.

A further object is to provide an air conditioner control circuit permitting independent selection of the comfort level in the air conditioner area.

An additional object is the provision of an air conditioner control circuit that automatically disengages the clutch when temperature becomes too cold or drops a prescribed amount below the low side of fan temperature range thereby allowing the air-conditioned area to warm up; however, when air temperature raises to a prescribed amount above the low side of the fan temperature range, the clutch is automatically engaged to place the air conditioner under normal operation.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

Figure 1:
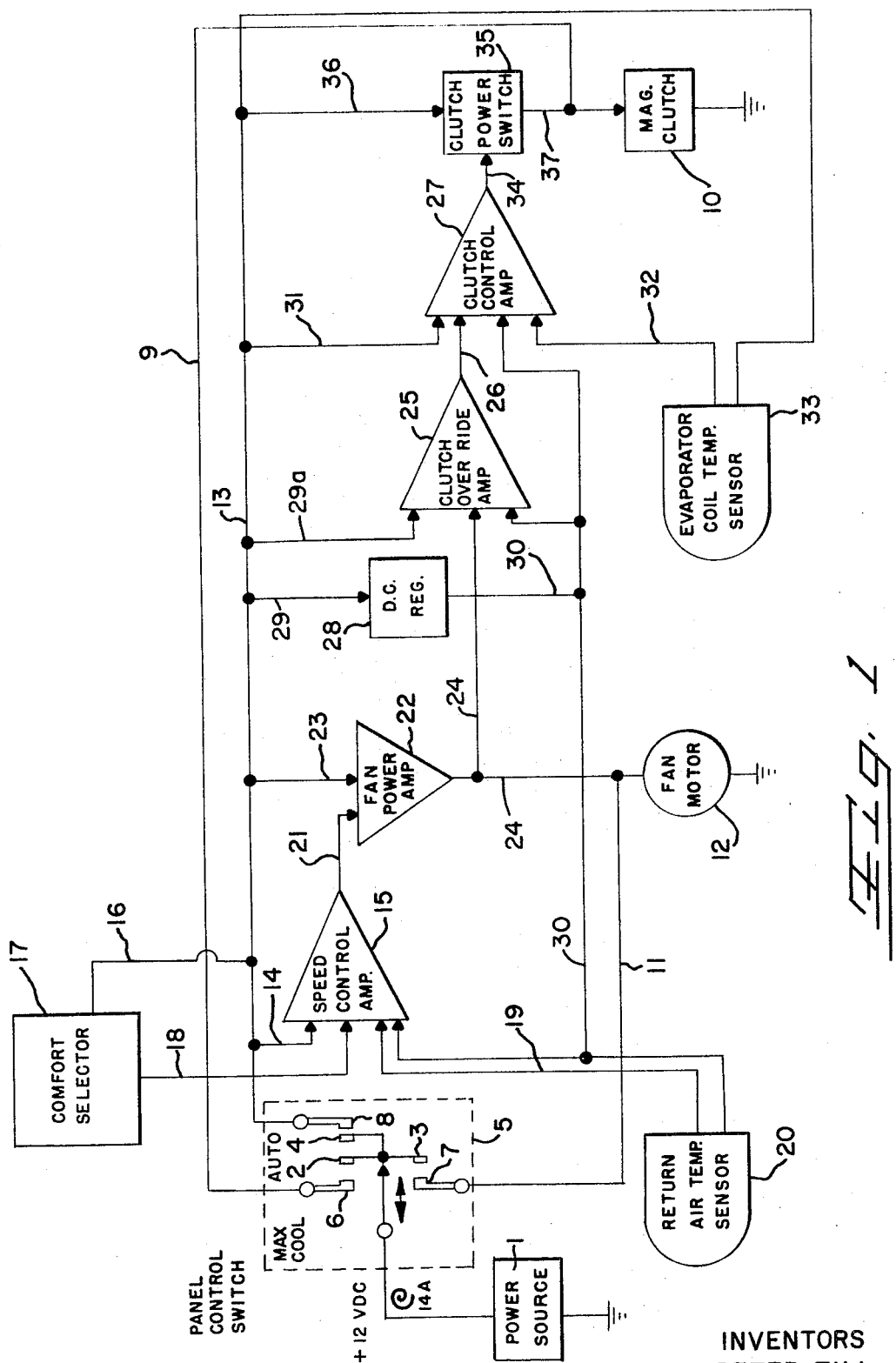
FIG. 1 is a block diagram of a fan and clutch control circuit for an air conditioner.

Turning to the drawings and more particularly FIG. 1, a block diagram of the fan and clutch control circuit for an air conditioner is illustrated and it includes a source of supply 1 such as, for example, a 12-volt battery having a negative side grounded with the positive side connected to common movable contacts 2, 3 and 4 of a manually operated selector switch 5. Movable contacts 2 and 3 are disposed opposite a pair of stationary contacts 6 and 7 while movable contact 4 is disposed opposite another stationary contact 8. In one position of switch 5, movable contact 4 is electrically engaged with stationary contact 8 while in the other position, movable contacts 2 and 3 are in electrical engagement with stationary contacts 6 and 7, respectively.

Contact 6 is connected via lead 9 to one side of magnetic clutch 10 which has the other side connected to ground. Lead 11 connects contact 7 to one side of fan motor 12 which has the other side connected to ground. Lead 13 is connected to contact 8 and provides a common source of positive voltage for control circuitry. Lead 14 connects speed control amplifier 15 to lead 13 while lead 16 connects one side of comfort selector 17 through a resistor 39 to lead 13, the other side of comfort selector 17 being connected to speed control amplifier 15 via lead 18. Return air temperature sensor 20 is connected to speed control amplifier 15 via lead 19.

The output of speed control amplifier 15 is connected via lead 21 to fan power amplifier 22 and lead 23 connects fan power amplifier 22 to lead 13. The output of fan power amplifier 22 is connected via lead 24 to the one side of fan motor 12 and also to the input of clutch override amplifier 25. The output of clutch override amplifier 25 is connected via lead 26 to clutch control amplifier 27. Lead 29 connects lead 13 to one side of DC regulator 28 while lead 30 connects the other side of the DC regulator to the input of clutch override amplifier 25, clutch control amplifier 27, and speed control amplifier 15. Lead 29a connects lead 13 to the clutch override amplifier 25. Lead 31 connects clutch control amplifier 27 to lead 13 while lead 32 connects evaporator coil temperature sensor 33 to clutch control amplifier 27. Lead 34 connects the output of clutch control amplifier 27 to clutch switch 35 which has one side connected to lead 13 via lead 36 while lead 37 connects the other side to magnetic clutch 10.

Figure 2:
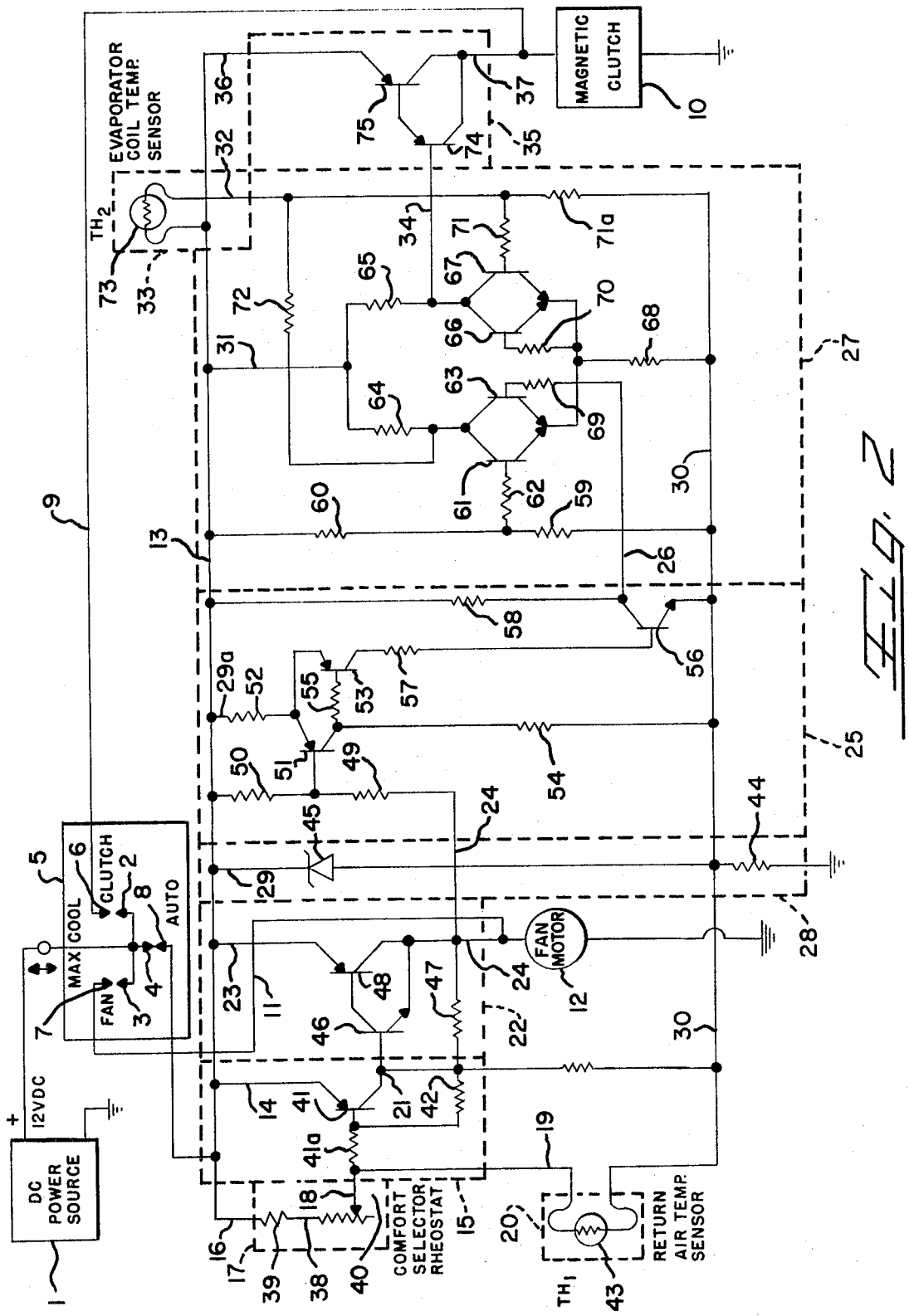
FIG. 2 is a wiring diagram of the circuit of FIG. 1.

Turning now to FIG. 2, comfort selector 17 comprises a rheostat having a stationary side 38 connected to lead 13 via lead 1b, including a resistor 39, while movable side 40 is connected to lead 18. Speed control amplifier 15 includes a transistor 41 having the emitter connected to lead 14, the base connected to lead 18 via resistor 41a and the collector connected to lead 21. A resistor 42 is connected between the base and collector of transistor 41. Return air temperature sensor 20 is a thermistor 43 having one side connected to lead 19 while the other side thereof is connected to one side of a resistor 44 in DC regulator 28 via lead 43a, the other side of resistor 44 being connected to ground. The one side of resistor 44 in DC regulator 28 is connected to one side of a zener diode 45 while the other side thereof is connected to lead 29.

Fan power amplifier 22 comprises transistor 46 having the base thereof connected to lead 21 and to the junction of resistors 42 and 47, the collector being connected to the base of transistor 48 and the emitter being connected to the collector of transistor 48. The emitter of transistor 48 is connected to lead 23 while the collector of transistor 48 is connected to resistor 47 and lead 24.

Clutch override amplifier 25 includes serially connected resistors 49 and 50 connected between lead 24 and lead 13 with the base of transistor 51 connected to the junction of these resistors. The emitter of transistor 51 is connected to lead 13 via resistor 52 and to the emitter of transistor 53 while the collector of transistor 51 is connected to lead 43a via resistor 54 and to the base of transistor 53 by means of resistor 55. The collector of transistor 53 is connected to the base of transistor 56 via resistor 57. The collector of transistor 56 is connected to lead 13 via resistor 58 and the emitter is connected directly to lead 43a.

Clutch control amplifier 27 includes resistors 59 and 60 connected between lead 13 and lead 43a with the junction thereof connected to the base of transistor 61 via resistor 62. The collectors of transistors 61 and 63 are connected together and they are connected to series connected resistors 64 and 65. The collectors of transistors 66 and 67 are connected together and to resistor 65. The junction of resistors 64 and 65 is connected to lead 31. The emitters of transistors 61, 63, 66 and 67 are connected together and the junction therebetween is connected via resistor 68 to lead 43a. The base of transistor 63 is connected to lead 26 via resistor 69. The base of transistor 66 is connected via resistor 70 to resistor 68. The base of transistor 67 is connected to lead 43a via serially connected resistors 71, 71a. Resistor 72 is connected between the junction between resistor 64 and the connection between the collectors of transistors 61 and 63 and lead 32 which is connected to one side of thermistor 73 defining the evaporator coil temperature sensor 33. The other side of thermistor 73 is connected to lead 13.

Clutch switch 35 comprises transistor 74 which has the base thereof connected to lead 34 while the emitter is connected to the base of transistor 75. The collectors of transistors 74 and 75 are connected together and to lead 37. The emitter of transistor 75 is connected to lead 36.

Figure 4:
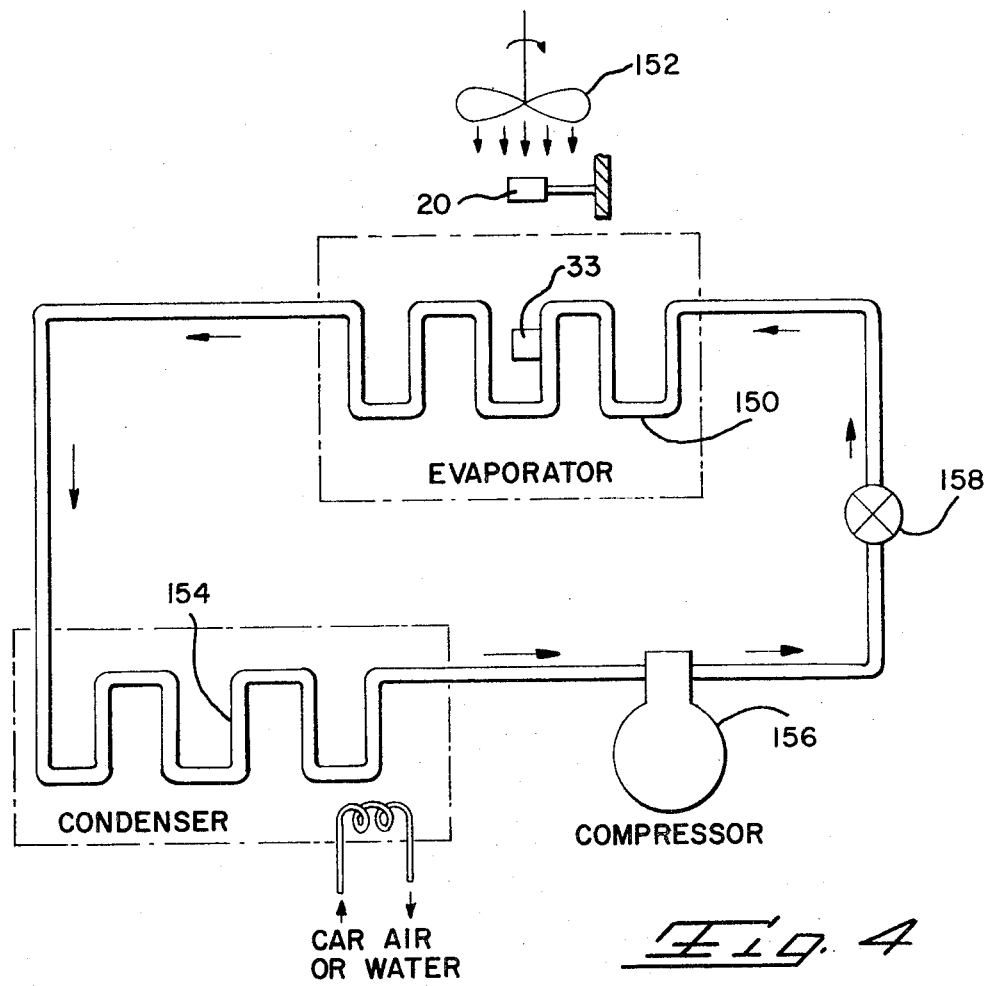
FIG. 4 is a schematic diagram of the conventional air conditioner refrigeration system for a vehicle, showing the association of sensor of the invention control circuit therewith.

Referring to FIG. 4, a conventional air conditioner refrigeration system with which the above-described control circuits are used is shown as including an evaporator 150 arranged in fluid communication with the conditioned space, air being forced in circulation by the fan 152 (which is driven by motor 12, of FIG. 2). The system further comprises a condenser 154 connected to the evaporator, a compressor 156, and an expansion valve 158 connected in the line from the compressor back to evaporator 150. The return air temperature sensor 20 (of FIGS. 1 and 2) is mounted in any suitable position in the region of air return to the air conditioner, such as in the return air duct to the fan. The evaporator coil temperature sensor 33, however, must be mounted directly on the coil of evaporator 150, as shown in FIG. 4.

With front panel selector switch 5 in "MAX COOL" position, positive DC source power is diverted around control circuitry and fed directly to fan motor 12 and magnetic clutch 10 giving the user the option of maximum cooling capacity and this constitutes by-pass circuit means.

DC regulator 28 comprising zener diode 45 across control circuitry and series dropping resistor 44 to ground provides source of regulated DC voltage to all control circuits when source voltage exceeds breakdown voltage of zener 45 and assures stability of operation during nominal fluctuations of source voltage.

With switch 5 in "AUTO" position, positive DC source power is applied to DC regulator 28, fan speed power amplifier 22, clutch power switch 35 and their control amplifiers 15 and 27 respectively.

Fan speed control consists of comfort selector rheostat 17 mounted to the front panel, return air sensor 20, speed control amplifier 15 and fan power amplifier 22.

With selector switch 5 in the "AUTO" position, comfort selector rheostat 17 set at some mid-range position allowing, for example, a 70° to 80° F control temperature band, and initially return air being at some temperature above 80° F, typical operation is as follows:

Referring to FIG. 2, resistor 39 and pre-set comfort selector rheostat 17 determine the fixed upper arm of a biasing network whereas thermistor sensor 43 positioned in return air path of fan is the variable lower arm of this network which controls the base-emitter bias voltage for speed control transistor 41, that in turn controls base current supplied to complementary Darlington connected transistors 46 and 48 of series fan power amplifier 22.

Figure 3:
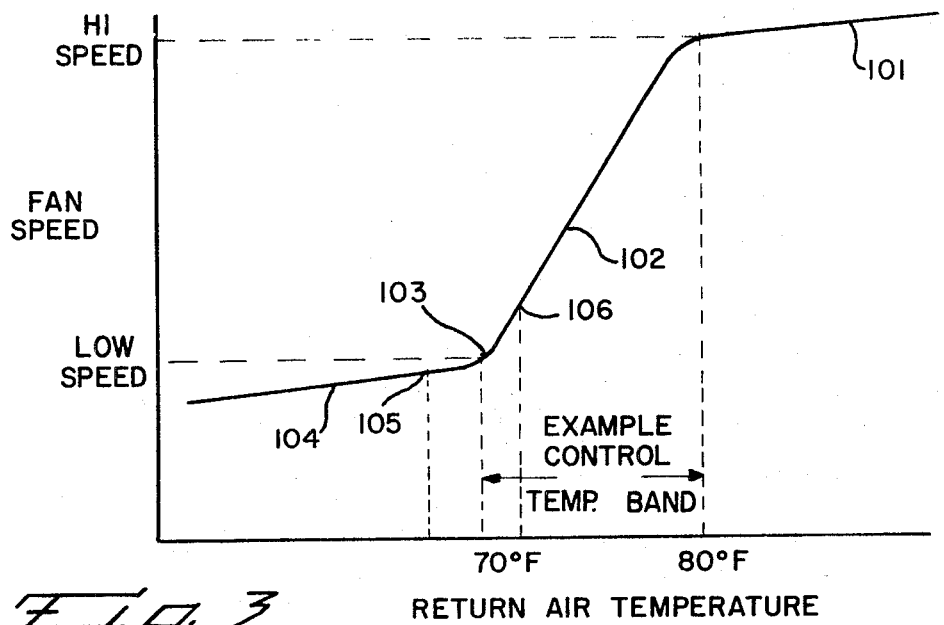
FIG. 3 is a curve showing the relationship between the return air temperature of the air conditioner and its fan speed.

Initially when return air temperature is above 80° F, at point 101 of FIG. 3, high speed operation will result, where thermistor 43 resistance is lowered and bias network provides maximum base voltage to transistor 41. This causes transistor 41 to saturate and produce low output impedance. The resulting low series impedance of 41 allows maximum base current to flow into the base of transistor 46, produces maximum collector current from 46 and in turn maximum base current flow out of power transistor 48. As a result, transistor 48 becomes saturated with minimum collector to emitter voltage drop. This allows maximum source voltage to be delivered to the fan load with resulting maximum fan current driving fan motor at high speed.

As the fan provides high speed air across the cooling coils of the evaporator, the outlet air will begin to cool the area to be conditioned. This cooler air will eventually return to the fan through the return air duct, pass across return air sensor 20, and cool thermistor 43. The resistance of thermistor 43 will now increase and affect a reduction in base-bias voltage to transistor 41, thus bringing transistor 41 out of saturation and increasing its output impedance. This increased series impedance presented to the base of transistor 46 will effectively reduce its base current and increase its output impedance. As a result, the base current flowing out of power transistor 48 will proportionally reduce, pulling it out of saturation and affect a proportional increase in its emitter to collector output impedance and series voltage drop. This will reduce voltage available to the fan motor, decrease its load current and in turn lower fan motor speed thereby placing it at some point on linear portion 102 of the fan speed curve, FIG. 3. The reduced velocity of air flowing across the cooling coils will in turn deliver reduced cooling capacity to the area to be conditioned. This action will now tend to gradually reduce the rate of change of the resistance of thermistor 43 and slow down cooling until either temperature stabilization between return air sensor and area to be conditioned is reached within desired temperature setting of comfort selector rheostat, or until low speed point 103 of FIG. 3 is reached as determined by the limiting value of resistor 42 which effectively shunts the now high output impedance of transistor 41. Any further decrease in return air temperature will only produce a slight reduction in fan speed as illustrated by 104 of FIG. 3. Clutch control consists of clutch control amplifier 27, evaporator coil temperature sensor 33 and clutch power switch 35.

Clutch control amplifier transistors 61, 63, 66 and 67 are connected in a differential amplifier configuration with feedback resistor 72 forming a regenerative bistable circuit used as a DC level detector that provides digital ON-OFF signals to clutch power switch 35 in response to linear signals developed across a resistive bridge network consisting of fixed resistors 59, 60, 71a, and variable resistance of thermistor 73. Thermistor 73, which acts as the evaporator coil temperature sensor, is bonded into the evaporator coil and its resistance varies proportionally with the coil temperature it senses.

During normal clutch operation, transistors 61 and 67 are the only active elements involved. Unused transistor 66 is rendered inoperative or reverse biased by connecting its base via resistor 70 to its emitter junction. Transistor 63 is also reverse biased during normal operation by clamping its base to lead 43a, via normally saturated clutch override output transistor 56.

At elevated compressor coil temperatures, the resistance of thermistor 73 will decrease causing base bias of transistor 67 to be higher than a fixed bias voltage supplied to transistor 61 by resistors 59 and 60. In this condition, transistor 67 will be conducting or switched on and transistor 61 will be non-conducting or off. When transistor 67 turns on, it will draw collector current through resistor 65, thus developing sufficient bias voltage at the base of transistor 74 to switch on both transistors 74 and 75. As a result, source power is applied to the clutch coil thereby energizing the clutch and engaging the compressor.

The base bias requirements for "ON to OFF" state of transistor 67 are determined by a voltage divider network consisting of resistors 64, 72, thermistor 73, and resistor 71a. Feedback resistor 72 will effectively shunt thermistor 73 resistance since with transistor 61 off it will essentially be tied to positive source voltage at lead 13 via low resistance of resistor 64. The low parallel resistance of resistor 72 and thermistor 73 will raise bias voltage and supply a large base current to transistor 67.

With the compressor engaged, coolant will flow thru the evaporator coils and cool fan air passing across them. As temperature of the coils decreases, the resistance of thermistor 73, now in parallel with resistor 72, will increase and gradually reduce the bias on the base of transistor 67 until a level is reached whereupon its base voltage is slightly below that of transistor 61 base. Transistor 61 will now turn on, conduct current through resistor 64 and drop the voltage level at the junction of resistors 64 and 72 near or below that of the base of transistor 67. This effectively takes feedback resistor 72 out of the bias circuit, further reducing base current available to transistor 67 thus regeneratively turning it off. With transistor 67 now off, collector current will cease to flow through resistor 65 and remove bias signal to clutch power switch transistors 74 and 75 and in effect turning them off.

This action will remove source power from the clutch, deenergizing it thereby causing the clutch to be disengaged which stops flow of coolant through compressor coils whereby temperature of coils begins to raise.

Due to the conduction of transistor 61, new base bias conditions for "OFF to ON" state of transistor 67 are established thereby requiring thermistor 73 alone to produce a large reduction in its resistance for a wide coil temperature increase in order to allow base of transistor 67 to return to its original "ON" bias state.

This offset action will allow the clutch to cycle compressor on or off over a wide temperature differential of 10° F or more, thus compensating for thermal time lag of air conditioning system.

Clutch override provides marginal weather control where indirect sensing of return air temperature is performed by monitoring voltage drop across fan power amplifier 22 by means of voltage divider resistors 49 and 50.

During normal operation of the fan and clutch, the override circuit will be deactivated since voltage drop across power amplifier 22 will be insufficient to bias transistor 51 on. When transistor 51 is off with no collector current flowing through resistor 54, the junction point of resistors 54 and 55 will be lowered to almost the level of lead 43a thereby effectively biasing transistor 53 on. The collector current of turned on transistor 53 flowing through resistor 57 will bias transistor 56 on and into saturation. This will effectively clamp the base of transistor 63 in clutch control amplifier 27 to lead 43a, thus reverse biasing transistor 63 and maintain it in an off state.

When return air temperature and fan speed drop to some predetermined temperature level 105, FIG. 3, below low speed point 103, the voltage developed across fan power amplifier 22 will raise the voltage at the junction of resistors 54 and 55 and regeneratively turn transistor 53 off, thus stopping flow of base current into transistor 56, turning it off and stopping flow of collector current through resistor 58. This effectively raises the junction point of resistors 58 and 69 to almost the level of lead 13, increases bias to the base of transistor 63 and gates it on.

If the clutch happened to be energized at this time, transistor 67 would be conducting; however, the gating action of transistor 63, in response to fan voltage being monitored will effect turning the clutch off, thus overriding any coil sensor signals and inhibiting normal clutch action until another predetermined temperature level 106 is reached above the low speed point 103 of FIG. 3 whereupon the override circuit will revert back to its original state and allow the clutch to resume its normal operation.

This override loop between the fan and clutch circuits is advantageous for marginal weather conditions where desired temperature is equal to or slightly below outside ambient temperature and the area to be conditioned does not necessarily need a large amount of cooling but only a slight amount of cooled air.

It will, therefore, be appreciated that the aforementioned and other desirable objects have been achieved; however, it should be emphasized that the particular embodiment of the invention, which is shown and described herein, is intended as merely illustrative and not as restrictive of the invention.

What is claimed is:

1. An electronic circuit for controlling the operation and speed of a fan of an air conditioner over a preselected temperature range and the operation of a compressor of the air conditioner at selected temperatures, said circuit comprising speed control circuit means having a return air temperature sensor means connected thereto to supply a control signal to said speed control circuit means corresponding to the air being sensed in a return air section of the air conditioner, power amplifier circuit means connected to said speed control circuit means to receive an output signal from said speed control circuit means and provide an amplified output signal, a fan motor connected to said power amplifier circuit means and adapted to be operated thereby at a speed in accordance with the amplified output signal, clutch control circuit means having an evaporator coil temperature sensor means connected thereto to supply another control signal to said clutch control circuit means corresponding to the temperature of the evaporator coil, switch means connected to said clutch control circuit means to receive an output signal from said clutch control circuit means and operate said switch means, an electrically operated clutch connected to said switch means for operation thereby to operate the air conditioner compressor when said switch means is operated, and override circuit means connected between said power amplifier circuit means and said clutch control circuit means to automatically deenergize said electrically operated clutch when the temperature drops a prescribed amount below a low side of the preselected temperature range.

2. An electronic circuit according to claim 1 wherein voltage regulator circuit means is connected to said override circuit means and said clutch control circuit means to control the voltage level thereto.

3. An electronic circuit according to claim 1 wherein selector circuit means is connected to said speed control circuit means to select the preselected temperature range.

4. An electronic circuit according to claim 1 wherein bypass circuit means is connected to said fan motor and said electrically operated clutch to operate said fan motor and said electrically operated clutch directly instead of by said speed control circuit means, power amplifier circuit means, clutch control circuit means and said switch means.

5. An electronic circuit according to claim 1 wherein said sensor means comprise thermistor means.

6. An electronic control circuit for controlling operation of a first member over a preselected temperature range and a second member at selected temperatures comprising first control circuit means having first temperature sensing means connected thereto to supply a control signal to said first control circuit means corresponding to the ambient condition of an area adjacent the first member being sensed by said first temperature sensing means, power amplifier circuit means connected to said first control circuit means to receive an output signal from said first control circuit means and provide an amplified output signal, first load means connected to said power amplifier circuit means and adapted to be operated thereby in accordance with the amplified output signal to operate the first member, second control circuit means having a second temperature sensing means connected thereto to supply another control signal to said second control circuit means corresponding to the ambient condition of another area adjacent the second member being sensed by said second temperature sensing means, switch means connected to said second control circuit means to receive an output signal from said second control circuit means and operate said switch means, second load means connected to said switch means and adapted to be operated thereby in accordance with the selected temperatures when said switch means is operated, and override circuit means connected between said power amplifier circuit means and said second control circuit means to automatically deenergize said second load means when the temperature drops a prescribed amount below a low side of the preselected temperature range.

7. An electronic control circuit according to claim 6 wherein said switch means comprises serially connected transistor means.

8. An electronic control circuit according to claim 6 wherein voltage regulator circuit means is connected to said override circuit means, said first control circuit means, and said second control circuit means to control the voltage level thereto.

9. An electronic control circuit according to claim 6 wherein by-pass circuit means is connected to said first and second load means to operate these load means directly instead of by said first and second circuit control means, power amplifier circuit means and said switch means.

* * * * *